United States Patent
Lee

(10) Patent No.: US 7,420,613 B2
(45) Date of Patent: Sep. 2, 2008

(54) METHOD FOR CONTROLLING FLASH APPARATUS, WHEREIN PRELIMINARY FLASHING IS PERFORMED ONE TIME

(75) Inventor: Seok-goun Lee, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 954 days.

(21) Appl. No.: 10/731,861

(22) Filed: Dec. 9, 2003

(65) Prior Publication Data

US 2004/0119879 A1  Jun. 24, 2004

(30) Foreign Application Priority Data

Dec. 14, 2002  (KR)  ............... 10-2002-0080032

(51) Int. Cl.
*H04N 5/222* (2006.01)
*G03B 15/03* (2006.01)

(52) U.S. Cl. .............. 348/371; 348/370; 396/155; 396/157

(58) Field of Classification Search .......... 348/370, 348/371; 396/157, 158, 205, 155
See application file for complete search history.

(56) References Cited

U.S. PATENT DOCUMENTS

| | | | |
|---|---|---|---|
| 5,539,456 A | * | 7/1996 | Ishii .................. 348/224.1 |
| 5,839,005 A | | 11/1998 | Fukui |
| 5,946,035 A | * | 8/1999 | Suh .......................... 348/371 |
| 5,950,023 A | * | 9/1999 | Hara et al. ................. 396/158 |
| 6,069,659 A | * | 5/2000 | Nakajima ................... 348/371 |
| 6,272,292 B1 | * | 8/2001 | Iwasaki et al. .............. 396/157 |
| 6,753,920 B1 | * | 6/2004 | Momose et al. ............. 348/371 |

* cited by examiner

*Primary Examiner*—Nhan T. Tran
*Assistant Examiner*—Richard M Bemben
(74) *Attorney, Agent, or Firm*—Drinker Biddle & Reath LLP

(57) ABSTRACT

A flash apparatus to perform preliminary flashing, detect an average brightness of surroundings in synchronization with a periodic signal subsequent to the preliminary flashing, and set main flashing time according to the detected average brightness, is controlled by controlling the flash apparatus to start preliminary flashing at a point earlier than a first point at which either a rising edge or a falling edge of a first pulse of the periodic signal is generated, detecting a first average brightness of surroundings at the first point, controlling the flash apparatus to terminate the preliminary flashing at a point later than the first point, detecting a second average brightness of surroundings at a second point at which either a rising edge or a falling edge of a second pulse subsequent to the first pulse of the periodic signal is generated, setting the main flashing time according to the detected first and second average brightness, and controlling the flash apparatus to perform main flashing according to the set main flashing time.

16 Claims, 8 Drawing Sheets

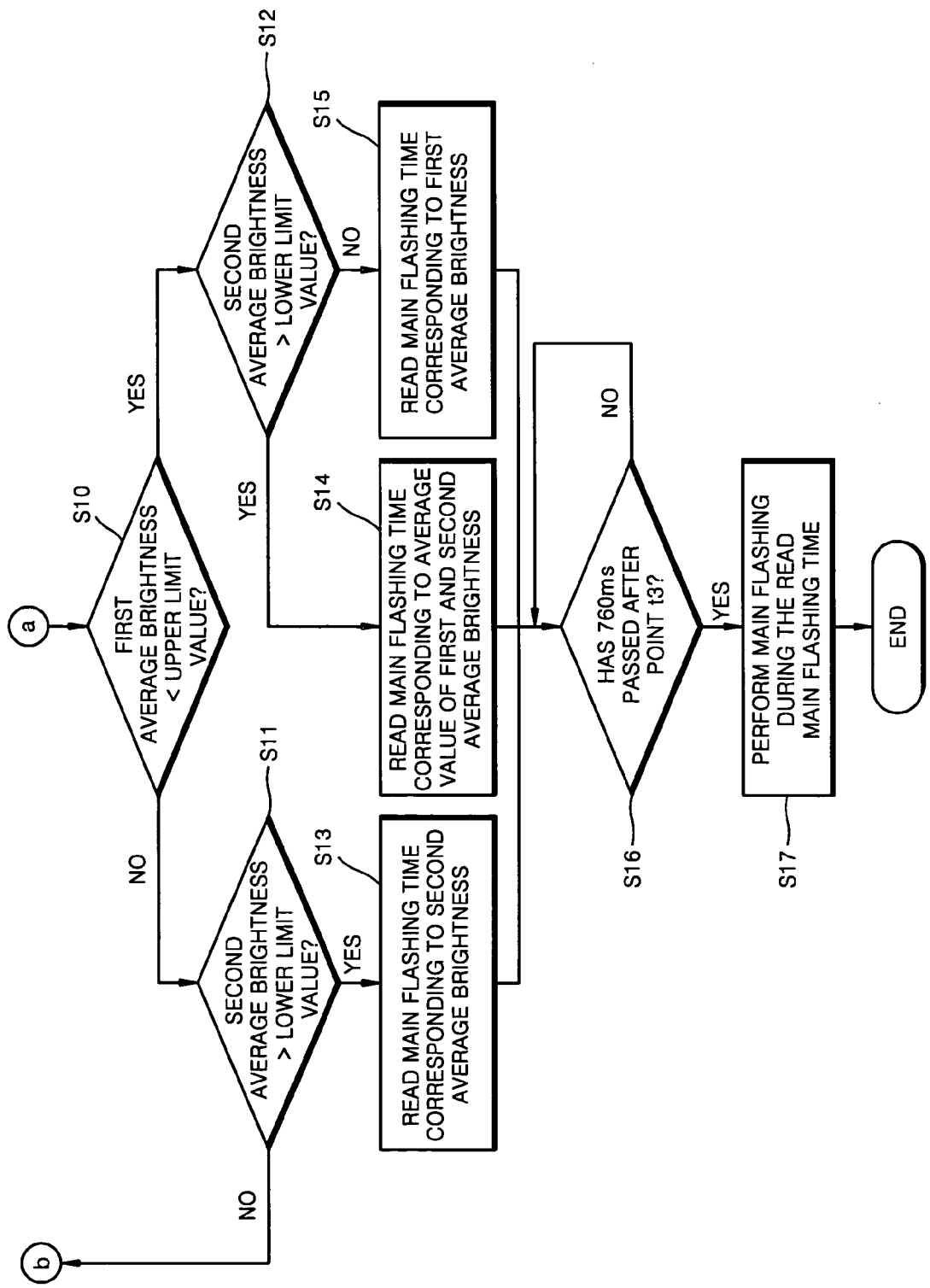

METHOD FOR CONTROLLING FLASH APPARATUS, WHEREIN PRELIMINARY FLASHING IS PERFORMED ONE TIME

BACKGROUND OF THE INVENTION

This application claims the priority of Korean Patent Application No. 2002-80032, filed on Dec. 14, 2002, in the Korean Intellectual Property Office, the disclosure of which is incorporated herein in its entirety by reference.

1. Field of the Invention

The present invention relates to a method of controlling a flash apparatus, and more particularly, to a method of controlling a flash apparatus in which a preliminary flashing is performed, an average brightness of the surroundings is detected in synchronization with a periodic signal subsequent to the preliminary flashing, and a main flashing time is set according to the detected average brightness.

2. Description of the Related Art

FIG. 1 is a block diagram showing the structure of a typical flash control apparatus of a camera. Referring to FIG. 1, a typical flash control apparatus of a digital camera, for example, a digital camera having a model name "Digimax 350SE" manufactured by Samsung Techwin Co., Ltd., includes an image detecting portion IS, an image signal processing portion SP, a timing signal generator TG, and a microcontroller MC.

The image sensing portion IS including a CCD (charge coupled device) or CMOS (complementary metal oxide semiconductor) converts light energy from an object OB to electric energy to generate an image signal in proportion to intensity of flashing of the camera. The image signal processing portion SP processes the image signal from the image sensing portion IS to generate an image signal Yp that is input to the microcontroller MC, and controls the operation of the timing signal generator TG. The timing signal generator TG generates a vertical sync signal VS according to timing control of the image signal processing portion SP and inputs the generated sync signal VS to the image sensing portion IS and the microcontroller MC. The microcontroller MC reads the image signal Yp output from the image signal processing portion SP according to the vertical sync signal VS output from the timing signal generator TG and generates a signal $S_{CFL}$ to control the operation of a flash apparatus FL. The flash apparatus FL includes a light emission driving portion LDR and a light emitting device LE. The light emission driving portion LDR of the flash apparatus FL drives the light emitting device LE according to the control signal $S_{CFL}$ output from the microcontroller MC.

FIG. 2 is a waveform diagram showing a conventional method of controlling the flash control apparatus of FIG. 1. Referring to FIGS. 1 and 2, when a control signal $S_{CFL1}$ is input to the flash apparatus FL from the microcontroller MC, a preliminary flashing is performed for a short time during a period in which a falling pulse is not generated in the vertical sync signal VS. The preliminary flashing is terminated at a point t1. Next, the microcontroller MC detects an average brightness of the surroundings based on the image signal Yp output from the image signal processing portion SP at a point t2 at which a falling edge of the falling pulse is generated in the vertical sync signal VS. A main flashing time is set and applied in inverse proportional to the detected average brightness. When the preliminary flashing is performed for a relatively short time, with respect to the object OB disposed close to the camera, brightness histogram with respect to pixels of the image sensing portion IS appears to be normal, as shown in FIG. 3A, so that the average brightness of the surroundings is detected accurately. However, with respect to the object OB disposed far from the camera, brightness histogram with respect to the pixels of the image sensing portion IS appears abnormal, as shown in FIG. 3B, so that the average brightness of the surroundings is detected inaccurately.

When a control signal $S_{CFL2}$ is input to the flash apparatus FL from the microcontroller MC, a preliminary flashing is performed for a long time during a period in which a falling pulse is not generated in the vertical sync signal VS. The preliminary flashing is terminated at a point t1. Next, the microcontroller MC detects an average brightness of the surroundings based on the image signal Yp output from the image signal processing portion SP at the point t2 when a falling edge of the falling pulse is generated in the vertical sync signal VS. A main flashing time is set and applied in inverse proportional to the detected average brightness. When the preliminary flashing is performed for a relatively long time, with respect to the object OB disposed far from the camera, brightness histogram with respect to pixels of the image sensing portion IS appears to be normal, as shown in FIG. 4A, so that the average brightness of the surroundings is detected accurately. However, with respect to the object OB disposed close to the camera, brightness histogram with respect to the pixels of the image sensing portion IS appears abnormal, as shown in FIG. 4B, so that the average brightness of the surroundings is detected inaccurately.

Thus, according to the above typical control method, the preliminary flashing is needed at least two times, as shown in the waveform of a control signal $S_{CFL3}$. When the flash apparatus FL is operated according to the control signal $S_{CFL3}$, the short preliminary flashing is terminated at the point t1 and a first average brightness is detected at the point t2 when a falling edge of the first pulse is generated in the vertical sync signal VS. The long preliminary flashing is terminated at a point t3 and a second average brightness is detected at a point t4 at which a falling edge of the second pulse is generated in the vertical sync signal VS. According to the typical control method, since at least two times preliminary flashing are needed, power consumption of the flash apparatus FL increases while the life span thereof decreases.

SUMMARY OF THE INVENTION

To solve the above and/or other problems, the present invention provides a method of controlling a flash apparatus in which both the short preliminary flashing and the long preliminary flashing are performed through one time preliminary flashing so that power consumption of the flash apparatus is reduced and the life span thereof is increased.

According to an aspect of the present invention, a method of controlling a flash apparatus to perform preliminary flashing, detect an average brightness of surroundings in synchronization with a periodic signal subsequent to the preliminary flashing, and set main flashing time according to the detected average brightness, the method comprises controlling the flash apparatus to start preliminary flashing at a point earlier than a first point at which any of a rising edge and a falling edge of a first pulse of the periodic signal is generated, detecting a first average brightness of surroundings at the first point, controlling the flash apparatus to terminate the preliminary flashing at a point later than the first point, detecting a second average brightness of surroundings at a second point at which any of a rising edge and a falling edge of a second pulse subsequent to the first pulse of the periodic signal is generated, setting the main flashing time according to the detected first and second average brightness, and controlling the flash apparatus to perform main flashing according to the set main flashing time.

BRIEF DESCRIPTION OF THE DRAWINGS

The above and other features and advantages of the present invention will become more apparent by describing in detail preferred embodiments thereof with reference to the attached drawings in which:

FIGS. 7A and 7B are flow chart for explaining the algorithm of the microcontroller of FIG. 5 to perform the control method of FIG. 6.

DETAILED DESCRIPTION OF THE INVENTION

Figure 1:
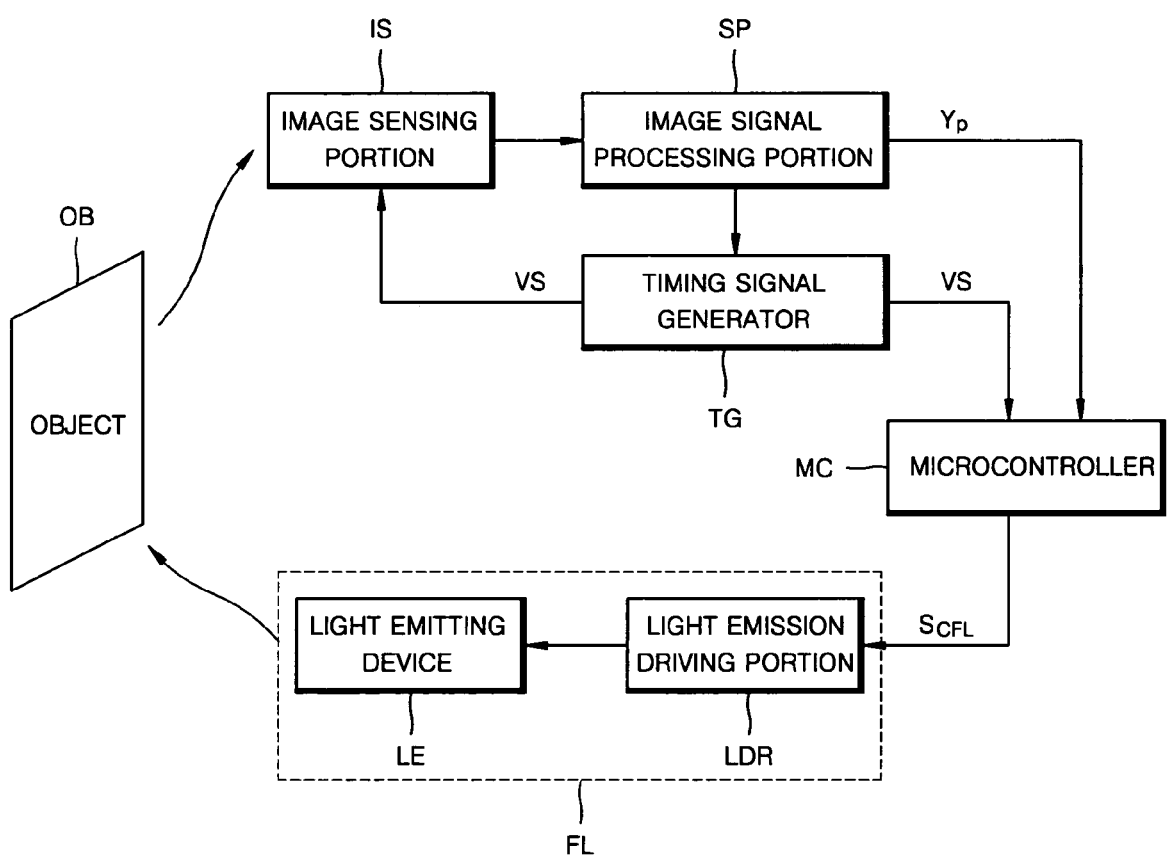
FIG. 1 is a block diagram illustrating showing the structure of a typical flash control method in a camera.
Figure 2:
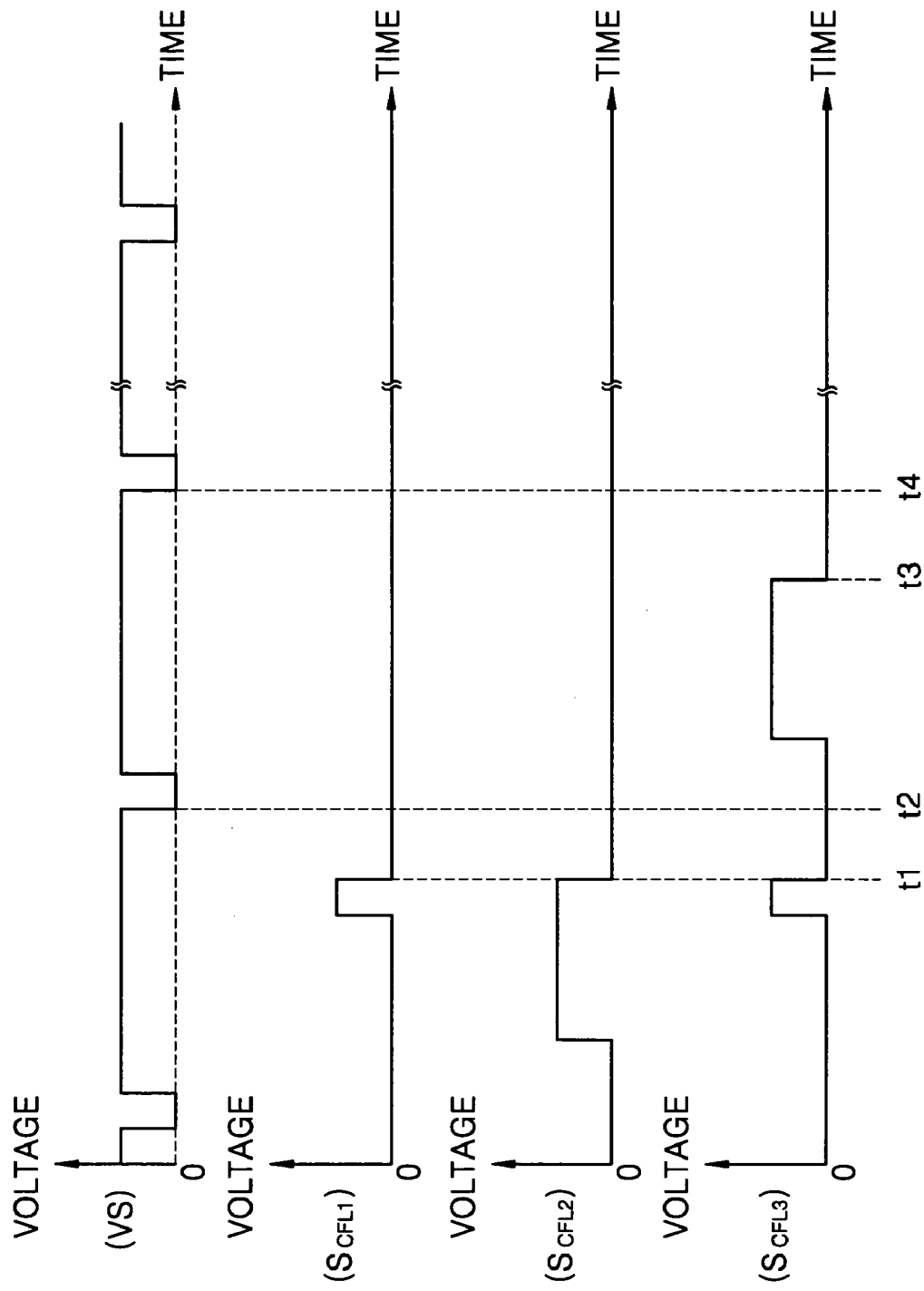
FIG. 2 is a waveform diagram showing a typical control method in the flash apparatus of FIG. 1.
Figure 3A:
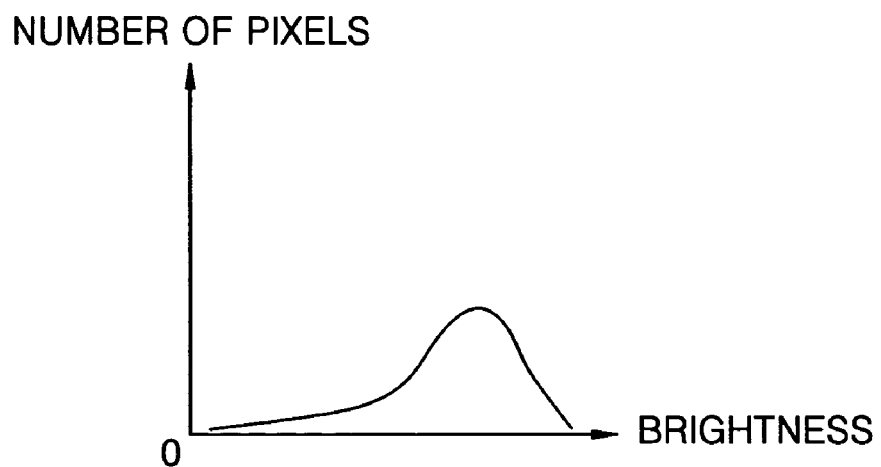
FIG. 3A is a graph showing brightness histogram with respect to an object disposed close to the camera when a preliminary flashing is performed according to the signal $S_{CFL1}$ of FIG. 2.
Figure 3B:
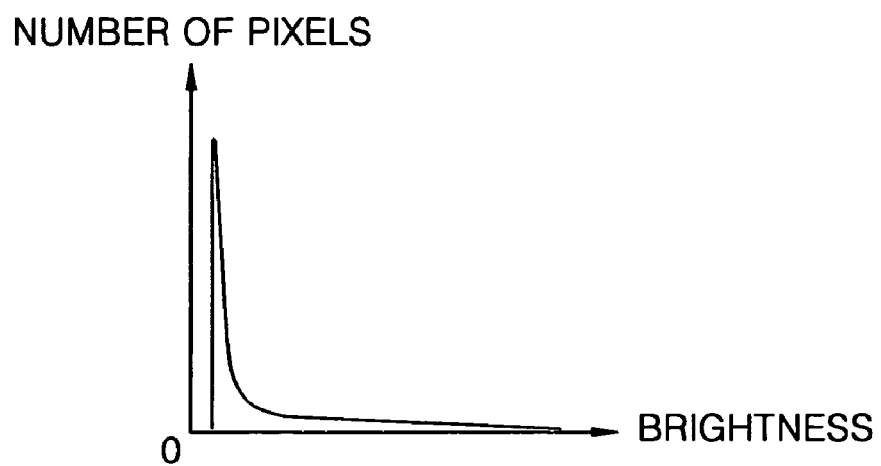
FIG. 3B is a graph showing brightness histogram with respect to an object disposed far from the camera when a preliminary flashing is performed according to the signal $S_{CFL1}$ of FIG. 2.
Figure 4A:
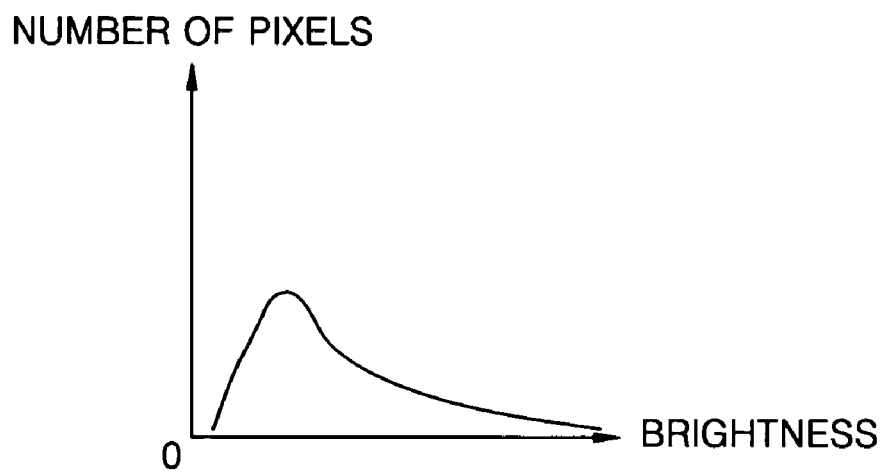
FIG. 4A is a graph showing brightness histogram with respect to an object disposed far from the camera when a preliminary flashing is performed according to the signal $S_{CFL2}$ of FIG. 2.
Figure 4B:
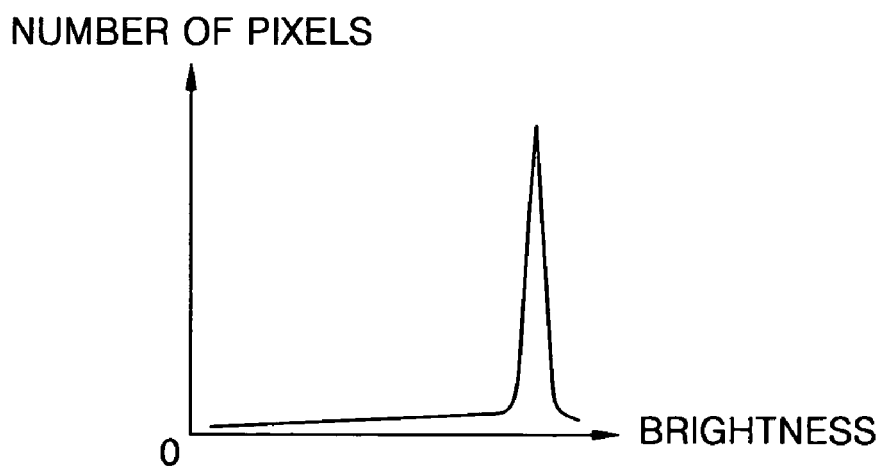
FIG. 4B is a graph showing brightness histogram with respect to an object disposed close to the camera when a preliminary flashing is performed according to the signal $S_{CFL2}$ of FIG. 2.
Figure 5:
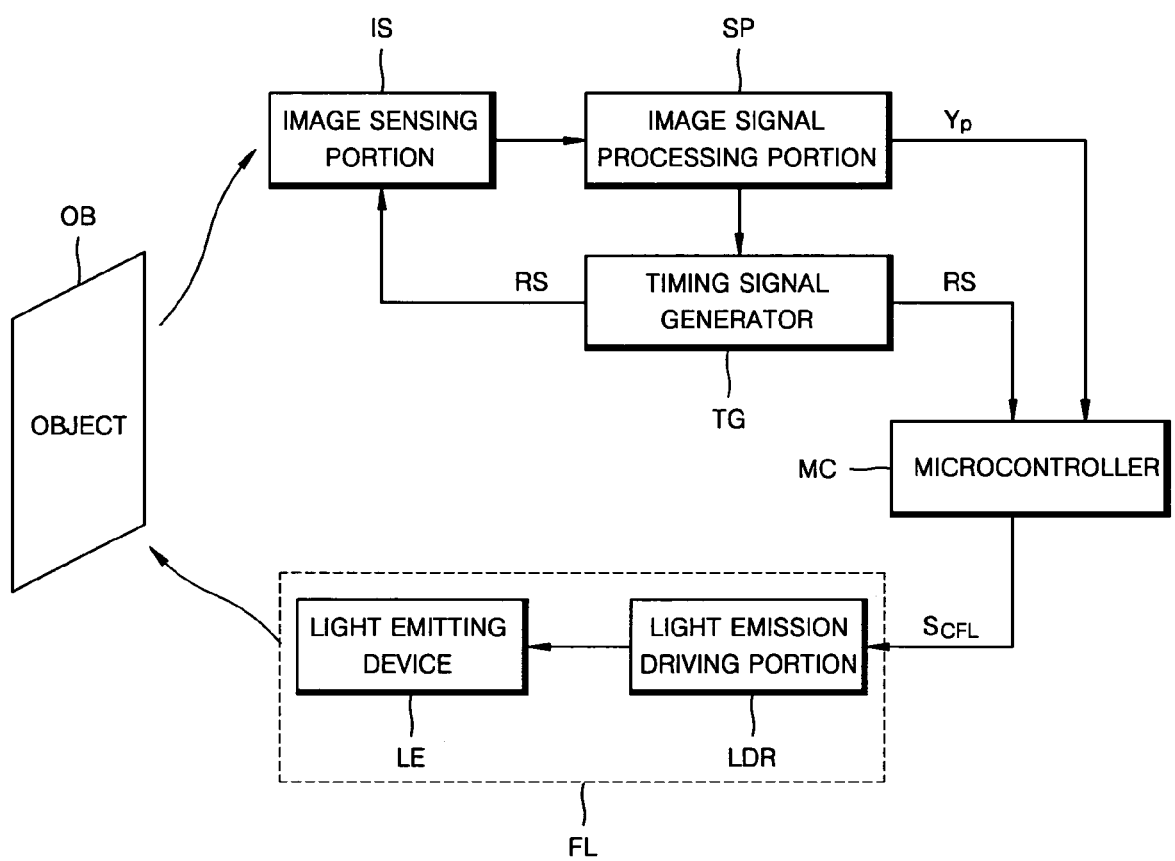
FIG. 5 is a block diagram illustrating the structure of a flashing control apparatus in a camera in which a method of controlling the flash apparatus according to a preferred embodiment of the present invention is performed.

Referring to FIG. 5, a flash control apparatus according to a preferred embodiment of the present invention includes an image sensing portion IS, an image signal processing portion SP, a timing signal generator TG, and a microcontroller MC.

The image sensing portion IS includes a CCD (charge coupled device) or a CMOS (complementary metal oxide semiconductor) and converts light energy from an object OB to electric energy to generate an image signal in proportion to strength of flash of a camera. The image signal processing portion SP processes an image signal from the image sensing portion IS and outputs the processed image signal to the microcontroller MC. The image signal processing portion SP controls the operation of the timing signal generator TG.

Figure 6:
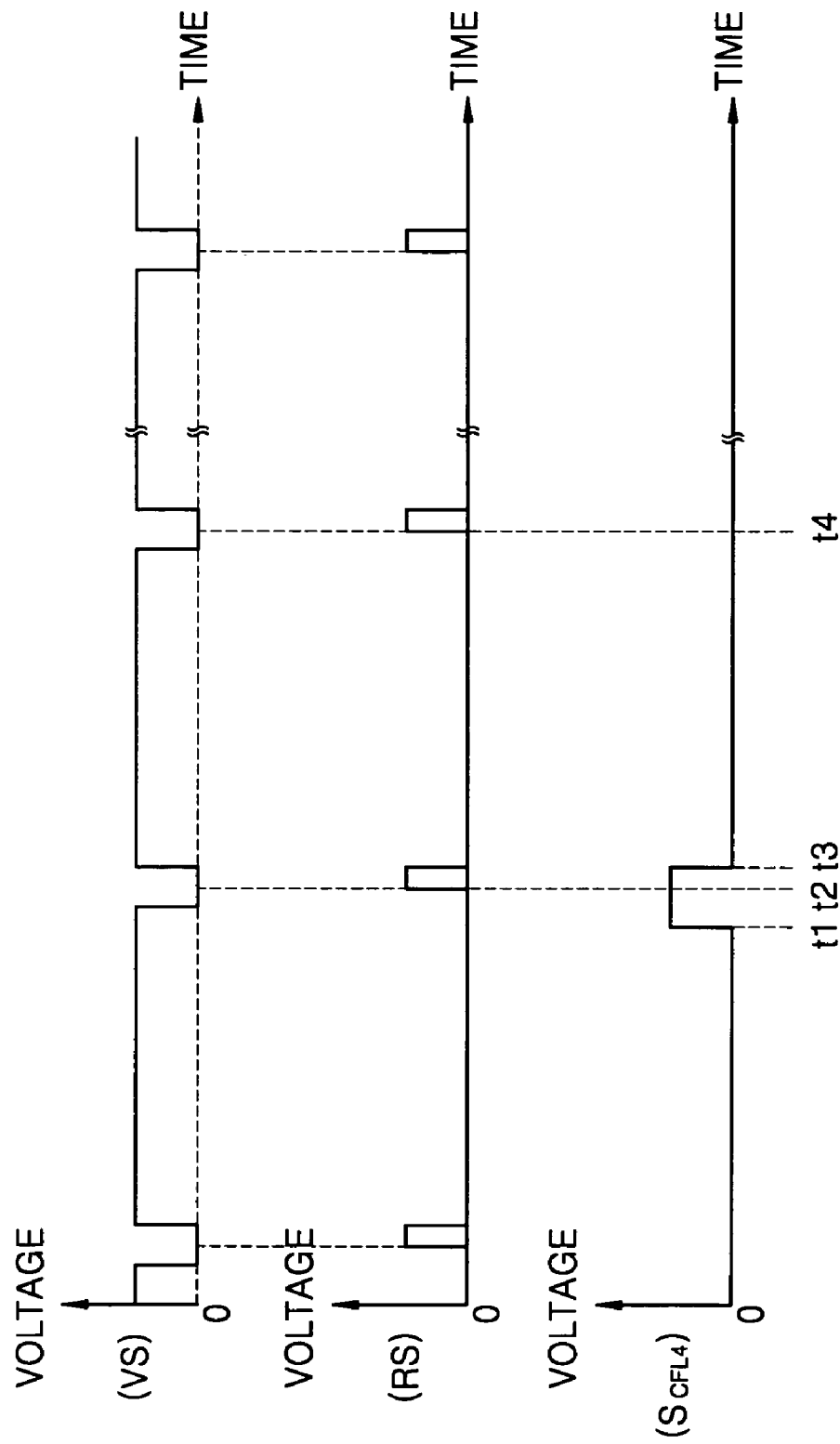
FIG. 6 is a waveform diagram showing the method of controlling the flashing control apparatus of FIG. 5.

The timing signal generator TG outputs a read-out signal RS to the image sensing portion IS and the microcontroller MC according to the timing control of the image signal processing portion SP. Referring to FIG. 6, the rising point of each pulse of the read-out signal RS is generated after a falling point of each pulse in the vertical sync signal VS is passed. The width of the pulse of the read-out signal RS is narrower than that of the pulse of the vertical sync signal VS. Accordingly, by using the read-out signal RS in which a falling time of a pulse is short instead of the vertical sync signal VS, the microcontroller MC can more accurately detects an average brightness of an image signal Yp. At the rising point of the pulse of the read-out signal RS, optical charges formed in the image sensing portion IS are transferred to the image signal processing portion SP and simultaneously the image signal Yp output from the image signal processing portion SP is input to the microcontroller MC.

The microcontroller MC determines the image signal Yp from the image signal processing portion SP according to the read-out signal RS from the timing signal generator TG and generates a signal $S_{CFL}$ to control the operation of the flash apparatus FL. The light emission driving portion LDR of the flash apparatus FL drives the light emitting device LE according to the control signal $S_{CFL}$ of the microcontroller MC.

FIG. 6 shows a method of controlling the flash control apparatus of FIG. 5, in which $S_{CDL4}$ denotes a control signal output from the microcontroller MC and input to the flash apparatus FL. In FIG. 6, the widths of pulses of the read-out signal and the control signal $S_{CDL4}$ are substantially narrower than those of pulses of the vertical sync signal VS. Thus, more accurate control is possible by using the read-out signal RS.

Referring to FIGS. 5 and 6, the rising point of each pulse of the read-out signal RS is generated after the falling point of each pulse of the vertical sync signal VS is passed. After a point is passed at which a rising edge of a rising pulse of the read-out signal RS is generated, preliminary flashing starts at a point t1 that is earlier than a first point t2 when a rising edge of a first rising pulse subsequent to the prior rising pulse is generated. Next, at the point t2, the microcontroller MC detects an average brightness of the surroundings based on the image signal Yp output from the image signal processing portion SP. In one embodiment, the time interval between t1 and t2 is 4 microseconds. Next, the flash apparatus FL is controlled so that the preliminary flashing ends at a point t3 that is later than the first point t2. In one embodiment, the time interval between t1 and t3 is 24 microseconds. Then, an average brightness of the surroundings is detected at a second point t4 at which a rising edge of a second subsequent rising pulse of the read-out signal RS is generated. In one embodiment, the time interval between t1 and t4 is 16.67 milliseconds under an NTSC format.

A main flashing time is set according to a first average brightness detected at the first point t2 and a second average brightness detected at the second point t4. Since the microcontroller MC retains in the lookup table data of the main flashing time with respect to an average value of the first and second average brightness, the main flashing time can be set more quickly. The main flashing time is set to be inversely proportional to the average value of the first and second average brightness. The flash apparatus FL is controlled to perform main flashing according to the set main flashing time.

According to the method of controlling the flash apparatus FL according to a preferred embodiment of the present invention, the first average brightness to a relatively short flashing period t1-t2 from the start point t1 of the preliminary flashing to the first point t2 is detected. The second average brightness to a relatively long flashing period t1-t3 from the start point t1 of the preliminary flashing to the end point t3 is detected. Accordingly, since the short preliminary flashing and the long preliminary flashing are performed by one-time preliminary flashing, power consumption of the flash apparatus FL is reduced and the life span thereof is extended.

Figure 7A:
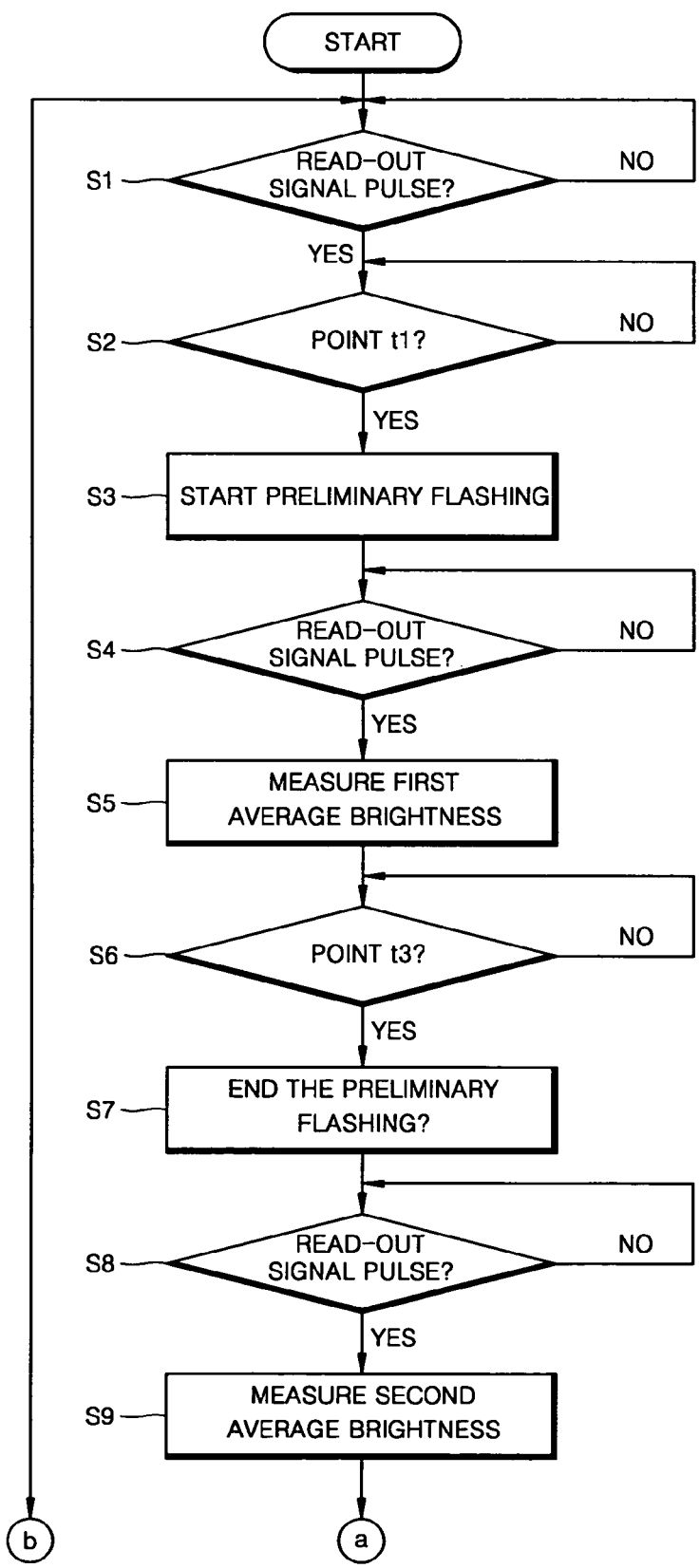

Referring to FIGS. 6 through 7B, the algorithm of the microcontroller MC of FIG. 5 to perform the control method of FIG. 6 is described below.

First, preliminary flashing is performed (Step S3) at the point t1 after a rising pulse of the read-out signal RS is generated (Steps S1 and S2). Next, the first average brightness is measured (Step S5) at the first point t2 at which a rising edge of the first subsequent rising pulse of the read-out signal RS is generated (Step S4).

The preliminary flashing ends at the point t3 (Step S7). The second average brightness is measured (Step S9) at the second point t4 at which a rising edge of the second subsequent falling pulse of the read-out signal RS is generated (Step S8).

When the first average brightness is smaller than the upper limit value and the second average brightness is greater than the lower limit value, main flashing time corresponding to an average value of the first and second average brightness is read from the lookup table (Steps S10, S12, and S14).

When the first average brightness is smaller than the upper limit value and the second average brightness is not more than the lower limit value, main flashing time corresponding to the first average brightness is read from the lookup table (Steps S10, S12, and S15). Also, when the first average brightness is not less than the upper limit value and the second average brightness is greater than the lower limit value, main flashing time corresponding to the second average brightness is read from the lookup table (Steps S10, S11, and S13). However, when the first average brightness is not less than the upper limit value and the second average brightness is not more than the lower limit value, it is determined that a data error occurs so that the program goes back to Step S1 and the steps are executed from the first (Steps S10 and S11).

Next, after 760 ms is passed from the point t3, main flashing is performed during the read main flashing time (Steps S16 and S17). According to the experiments, when main flashing is performed after about 760 ms is passed from the point t3, a red-eyes phenomenon due to flash is minimized.

While this invention has been particularly shown and described with reference to preferred embodiments thereof, it will be understood by those skilled in the art that various changes in form and details may be made therein without departing from the spirit and scope of the invention as defined by the appended claims.

As described above, according to the method of controlling a flash apparatus according to the present invention. the first average brightness can be detected with respect to relatively short flashing time from a start point of the preliminary flashing to a certain point. The second average brightness can be detected with respect to a relatively long time from the start point of the preliminary flashing to an end point. Therefore, since short preliminary flashing and long preliminary flashing are simultaneously performed with one-time preliminary flashing, power consumption of the flash apparatus is reduced and the life span thereof is extended.

What is claimed is:

1. A method of performing preliminary flashing for a camera, the method comprising:
    generating a first readout signal pulse;
    performing preliminary flashing at a time t1 after the rising edge of the first readout signal;
    generating the rising edge of a second readout signal pulse at a time t2 that is after time t1;
    collecting optical charges and measuring a first average brightness at time t2;
    ending preliminary flashing at a time t3 after time t2;
    generating the rising edge of a third readout signal pulse at a time t4;
    collecting optical charges and measuring a second average brightness at time t4; and
    comparing the first average brightness with an upper limit and comparing the second average brightness with a lower limit.

2. The method of claim 1, wherein the rising edge of the readout signal pulses are generated after the falling edge of vertical sync signals.

3. The method of claim 1, wherein the first average brightness is measured exactly at time t2.

4. The method of claim 1, wherein the second average brightness is measured exactly at time t4.

5. A method of performing preliminary flashing for a camera, the method comprising:
    generating a first readout signal pulse;
    performing preliminary flashing at a time t1 after the rising edge of the first readout signal;
    generating the rising edge of a second readout signal pulse at a time t2 that is after time t1;
    collecting optical charges and measuring a first average brightness at time t2;
    ending preliminary flashing at a time t3 after time t2;
    generating the rising edge of a third readout signal pulse at a time t4; and
    collecting optical charges and measuring a second average brightness at time t4, wherein
    if the first average brightness is greater than an upper limit and the second average brightness is less than a lower limit, then redoing the process, beginning with the first step.

6. A method of performing preliminary flashing for a camera, the method comprising:
    generating a first readout signal pulse;
    performing preliminary flashing at a time t1 after the rising edge of the first readout signal;
    generating the rising edge of a second readout signal pulse at a time t2 that is after time t1;
    collecting optical charges and measuring a first average brightness at time t2;
    ending preliminary flashing at a time t3 after time t2;
    generating the rising edge of a third readout signal pulse at a time t4; and
    collecting optical charges and measuring a second average brightness at time t4, wherein
    if the first average brightness is greater than an upper limit and the second average brightness is greater than a lower limit, then setting main flashing time in accordance with the second average brightness.

7. A method of performing preliminary flashing for a camera, the method comprising:
    generating a first readout signal pulse;
    performing preliminary flashing at a time t1 after the rising edge of the first readout signal;
    generating the rising edge of a second readout signal pulse at a time t2 that is after time t1;
    collecting optical charges and measuring a first average brightness at time t2;
    ending preliminary flashing at a time t3 after time t2;
    generating the rising edge of a third readout signal pulse at a time t4; and
    collecting optical charges and measuring a second average brightness at time t4, wherein
    if the first average brightness is less than an upper limit and the second average brightness is greater than a lower limit, then setting main flashing time in accordance with the average of the first average brightness and the second average brightness.

8. The method of claim 7, wherein the main flashing time is inversely proportional to the average of the first average brightness and the second average brightness.

9. A method of performing preliminary flashing for a camera, the method comprising:
generating a first readout signal pulse;
performing preliminary flashing at a time t1 after the rising edge of the first readout signal;
generating the rising edge of a second readout signal pulse at a time t2 that is after time t1;
collecting optical charges and measuring a first average brightness at time t2; ending preliminary flashing at a time t3 after time t2;
generating the rising edge of a third readout signal pulse at a time t4; and
collecting optical charges and measuring a second average brightness at time t4, wherein
if the first average brightness is less than an upper limit and the second average brightness is less than a lower limit, then setting main flashing time in accordance with the first average brightness.

10. The method of claim 1, further comprising:
performing main flashing.

11. The method of claim 10, wherein the main flashing is performed a set time after t3.

12. The method of claim 11, wherein the set time is 760 ms.

13. The method of claim 1, wherein the camera is a digital camera.

14. A camera comprising:
an image sensing portion;
an image signal processing portion;
a light emitting device;
a light emission driving portion;
a microcontroller that generates a control signal and transmits the control signal to the light emission driving portion; and
a timing signal generator that generates both a read-out signal and a vertical sync signal and transmits each of the read-out signal and the vertical sync signal to both the image sensing portion and the microcontroller,
wherein the rising edge of each read-out signal is generated after the falling edge of each vertical sync signal, and
wherein the timing signal generator generates a first read-out signal pulse;
the light emitting device flashes at a time t1 after the rising edge of the first readout signal;
the timing signal generator generates the rising edge of a second readout signal pulse at a time t2 that is after time t1;
the image sensing portion collects charges and transfers the charges to the image signal processing portion;
the image signal processing portion outputs to the microcontroller an image signal relative to the charges;
the microcontroller measures a first average brightness of the image signal at time t2;
the light emitting device stops flashing at a time t3 after time t2;
the timing signal generator generates the rising edge of a third readout signal pulse at a time t4 and;
the microcontroller measures a second average brightness of the image signal at time t4.

15. The camera of claim 14, wherein the read-out signal comprises substantially smaller pulses than the vertical sync signal.

16. The camera of claim 14, wherein the camera is a digital camera.

* * * * *